US011689520B2

(12) United States Patent
Zuzga et al.

(10) Patent No.: US 11,689,520 B2
(45) Date of Patent: Jun. 27, 2023

(54) DUAL DOMAIN CLOUD KERBEROS AUTHENTICATION

(71) Applicant: Okta, Inc., San Francisco, CA (US)

(72) Inventors: Brian Kenneth Zuzga, San Francisco, CA (US); Ka Wing Kevin Arion Loo, Mercer Island, WA (US); Hu Zhou, Sammamish, WA (US)

(*) Notice: Subject to any disclaimer, the term of this patent is extended or adjusted under 35 U.S.C. 154(b) by 201 days.

(21) Appl. No.: 16/951,374

(22) Filed: Nov. 18, 2020

(65) Prior Publication Data
US 2022/0158988 A1 May 19, 2022

(51) Int. Cl.
*H04L 29/06* (2006.01)
*H04L 9/40* (2022.01)

(52) U.S. Cl.
CPC ................. *H04L 63/0807* (2013.01)

(58) Field of Classification Search
CPC .................................................. H04L 63/0807
See application file for complete search history.

(56) References Cited

U.S. PATENT DOCUMENTS

| | | | |
|---|---|---|---|
| 10,904,314 B2* | 1/2021 | Rice | G06F 16/9577 |
| 11,070,514 B2* | 7/2021 | Li | H04L 67/52 |
| 11,122,029 B2* | 9/2021 | Huang | H04L 63/045 |
| 11,297,034 B2* | 4/2022 | Deverakonda Venkata | H04L 61/4511 |
| 11,516,260 B2* | 11/2022 | Duminuco | H04L 63/102 |
| 2007/0211714 A1* | 9/2007 | Metke | H04L 61/25 709/203 |
| 2014/0304766 A1* | 10/2014 | Livne | H04L 63/1433 726/1 |
| 2020/0213272 A1* | 7/2020 | Deverakonda Venkata | H04L 61/2503 |
| 2021/0042368 A1* | 2/2021 | Liu | G06F 16/955 |

OTHER PUBLICATIONS

Jaganathan, K. et al., "SPNEGO-based Kerberos and NTLM HTTP Authentication in Microsoft Windows," Jun. 2006, pp. 1-8.
MDN web docs, "HTTP authentication," Last Modified on Sep. 15, 2020, eight pages, [Online] [Retrieved on Dec. 18, 2020] Retrieved from the Internet <URL: https://developer.mozilla.org/en-US/docs/Web/HTTP/Authentication>.

* cited by examiner

Primary Examiner — Yonas A Bayou
(74) Attorney, Agent, or Firm — Holland & Hart LLP

(57) ABSTRACT

Authorizing access to a web domain involves a server device receiving, from a browser of a computing device, a request to access a web domain. The server device sends a web page to the browser of the computing device. The web page includes a redirect script that redirects the browser to a particular companion domain of the web domain, wherein the particular companion domain comprises a domain name system (DNS) zone file comprising an ALIAS record for the particular companion domain. The server device sends to the browser an authentication challenge for access to the web domain. The server device receives a Kerberos service ticket from the browser of the computing device. The server device provides the browser with access to the web page.

17 Claims, 5 Drawing Sheets

210A — foo.target-site.com | CNAME | internal.node.target-site.com
210B — internal.node.target-site.com | CNAME | asd543qw87z1.us-east-1.cloudprovider.com
210C — asd543qw87z1.us-east-1.cloudprovider.com | A | 248.176.123.247
210D — asd543qw87z1.us-east-1.cloudprovider.com | AAAA | 5ab3:d19c:c824:1cb2:fa80:f8f1:90fa:dc68

FIG. 2A

220A — foo.kerberos.target-site.com | A | 248.176.123.247
220B — foo.kerberos.target-site.com | AAAA | 5ab3:d19c:c824:1cb2:fa80:f8f1:90fa:dc68

FIG. 2B

DUAL DOMAIN CLOUD KERBEROS AUTHENTICATION

FIELD OF ART

The present invention generally relates to the field of cloud computing, and more specifically, to facilitating user authentication in a cloud computing environment.

BACKGROUND

The Domain Name System (DNS) is a worldwide directory service that maps Internet Protocol (IP) addresses of internet-connected resources to domain names. The DNS is a hierarchical system, where a network domain can include sub-domains. Users of web browsers often attempt to access resources at secure web domains where user authentication is required for access. Kerberos is a network authentication protocol that enables users to prove their identities to web domains in a secure manner.

Web resources are increasingly deployed using cloud computing infrastructure, where a user or organization deploys the web resources using a portion of one or more servers provided as part of the cloud computing infrastructure. For example, the user or organization may rent or lease a server or a portion thereof from an organization providing the cloud computing infrastructure. The topology of a cloud computing infrastructure can be complex, with a similarly complex domain hierarchy.

Generally speaking, Kerberos was developed before cloud computing entered the mainstream and hence was not designed with cloud computing in mind. Attempts at user authentication via Kerberos can fail when the web resource to be accessed is hosted by a server of a cloud computing infrastructure with a complex network topology, even if the user has permission to access the web resource. In particular, the Kerberos Key Distribution Center may refuse to issue the user a service ticket due to a Service Principal Name stored at the Key Distribution Center not matching the identifier of the web resource as provided by the user when requesting access. As such, users may be blocked from accessing web resources they should be able to reach.

SUMMARY

Authorizing access to a web domain involves a server device receiving, from a browser of a computing device, a request to access a web domain. The server device sends a web page to the browser of the computing device. The web page includes a redirect script that redirects the browser to a particular companion domain of the web domain, wherein the particular companion domain comprises a domain name system (DNS) zone file comprising an ALIAS record for the particular companion domain. The companion domain sends an authentication challenge to the browser for access to the web domain. The server device receives a Kerberos service ticket from the browser of the computing device. The server device provides the browser with access to the web domain.

In one embodiment, a computer-implemented method comprises receiving, from a browser of a computing device, a request to access a web domain. The computer-implemented method further comprises sending, to the browser of the computing device, a web page that comprises a redirect script that redirects the browser to a particular companion domain of the web domain, wherein the particular companion domain comprises a DNS zone file comprising an ALIAS record for the particular companion domain. The computer-implemented method further comprises the companion domain sending an authentication challenge to the browser for access to the web domain. The computer-implemented method further comprises receiving, from the browser of the computing device, a Kerberos service ticket. The computer-implemented method further comprises providing, to the browser, access to the web domain.

In one embodiment, a non-transitory computer-readable storage medium stores computer program instructions executable by a processor to perform steps that comprise receiving, from a browser of a computing device, a request to access a web domain. The steps further comprise sending, to the browser of the computing device, a web page that comprises a redirect script that redirects the browser to a particular companion domain of the web domain, wherein the particular companion domain comprises a DNS zone file comprising an ALIAS record for the particular companion domain. The steps further comprise the companion domain sending an authentication challenge to the browser for access to the web domain. The steps further comprise receiving, from the browser of the computing device, a Kerberos service ticket. The steps further comprise providing, to the browser, access to the web domain.

In one embodiment, a system comprises a processor and a non-transitory computer-readable storage medium storing computer program instructions executable by the processor to perform steps that comprise receiving, from a browser of a computing device, a request to access a web domain. The steps further comprise sending, to the browser of the computing device, a web page that comprises a redirect script that redirects the browser to a particular companion domain of the web domain, wherein the particular companion domain comprises a DNS zone file comprising an ALIAS record for the particular companion domain. The steps further comprise the companion domain sending an authentication challenge to the browser for access to the web domain. The steps further comprise receiving, from the browser of the computing device, a Kerberos service ticket. The steps further comprise providing, to the browser, access to the web domain.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 2A illustrates DNS records related to a target site hosted by a cloud computing infrastructure, according to one embodiment.

FIG. 2B illustrates DNS records related to a target site hosted by a cloud computing infrastructure, according to a second embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
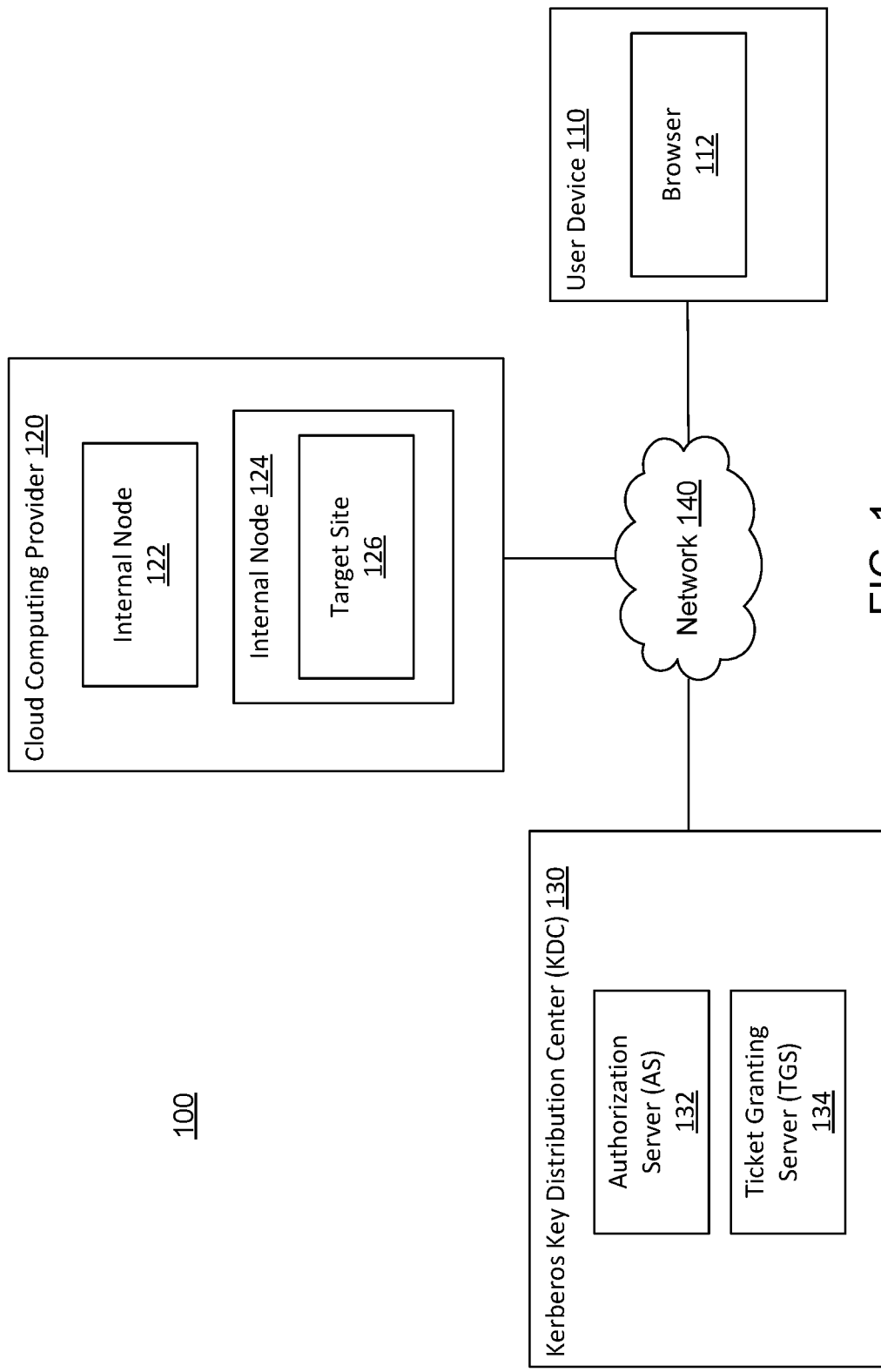
FIG. 1 illustrates a computing environment in which users of a user device use a browser to access a target site hosted by an internal node of a cloud computing provider, and in which the user is authenticated to the target site using a Kerberos protocol, according to one embodiment.

FIG. 1 illustrates a computing environment 100 in which users of a user device 110 use a browser 112 to access a target site 126 hosted by an internal node 124 of a cloud computing provider 120, and in which the user is authenticated to the target site 126 using a Kerberos protocol, according to one embodiment. The computing environment 100 includes the user device 110, the cloud computing provider 120, and a Kerberos Key Distribution Center (KDC) 130. The user device 110, cloud computing provider 120, and KDC 130 are communicatively connected via a network 140, e.g., the Internet. In an embodiment, the user device 110 and KDC 130 are connected by a local area network or on-premise network, and are connected to the cloud computing provider 120 via a second network. In such an embodiment, the network 140 comprises the local area network or on-premise network that communicatively connect the user device 110 and KDC 130, and also a second network, e.g., the Internet, with which the user device 110 communicates with the cloud computing provider 126.

The user device 110 is a computing device, such as a personal computer, laptop, mobile device, tablet, or the like, which is used by a user. The user device 110 is connected to the network 140 and uses the browser 112 to interface with domains accessible via the network 140. The user device 110 can include a display for presenting visual data, such as web pages. The browser 112 can include a user interface for navigating the network 140 and accessing resources connected to the network 140, such as web pages. The user device 110 receives input from the user at one or more input devices and provides output to the user at one or more output devices, such as the display. The user may be associated with a user account upon the user device 110, and the user account may be password protected.

The cloud computing provider 120 is an organization that provides cloud computing infrastructure to third parties. The cloud computing provider 120 may rent or lease one or more servers or portions of one or more servers to third parties, such as an organization that administrates the target site 126. The topology of the cloud computing infrastructure can be complex, with a similarly complex domain hierarchy.

The cloud computing provider 120 includes an internal node 122 and an internal node 124. Each internal node 122, 124 is a server in the cloud computing infrastructure of the cloud computing provider 120. Depending upon the embodiment, the cloud computing provider 120 can include additional internal nodes, including possibly millions of additional internal nodes. The internal nodes of the cloud computing provider 120 may be different types of internal nodes that serve different purposes within the cloud computing infrastructure. For example, internal node 122 may be a network load balancer that manages data flow within the cloud computing infrastructure, and internal node 124 may be a web server that hosts web resources, such as target site 126. The cloud computing infrastructure may be sufficiently complex and hierarchical that obtaining the IP address of internal node 124 involves passing through several layers of DNS records, such as first a network load balancer, e.g., internal node 122, which may be a DNS CNAME record for the web server, e.g., internal node 124. Domain configurations and zone files are described in further detail below with reference to FIG. 2.

The KDC 130 is a server providing functionality for the Kerberos authentication protocol. The Kerberos authentication protocol (Kerberos) is an authentication protocol that provides mutual authentication between a user and a server by way of a third party Kerberos server (or servers), the KDC 130, which uses cryptography, e.g., symmetric key cryptography, to secure the authentication process. The KDC 130 includes an Authentication Server (AS) 132 and a Ticket Granting Server (TGS) 134.

Authentication using Kerberos is initiated by a computing device, e.g., the user device 110, sending an authentication request to the AS 132. The authentication request includes a username, which identifies the user; a service name, which identifies the server for which the user wishes to gain mutual authentication, e.g., the target server hosting target site 126; the IP address of the user device 110; and a requested lifetime for a ticket granting ticket. The AS 132 has a data store including a list of users and corresponding secret keys, e.g., passwords. The AS 132 verifies the user is in the list and, if so, generates an AS message and uses the user's secret key to encrypt the generated AS message, which includes an identifier for the TGS 134, a timestamp, the requested lifetime, and a TGS session key. The AS 132 also generates a Ticket Granting Ticket (TGT) that is encrypted with the TGS secret key. The TGT includes the username, TGS identifier, timestamp, IP address of the user device 110, and the TGS session key.

The user device 110 decrypts the AS message using the user's secret key, which the user possesses. The user device 110 generates three messages to send to the TGS 134: First, a message containing the service name and a requested lifetime for the ticket. Second, the username and timestamp, which together are encrypted with the TGS session key that was obtained from the AS message. Third, the TGT, still encrypted with the TGS secret key. The user device 110 sends the messages to the TGS 134.

The TGS 134 decrypts the TGT with the TGS secret key and uses the obtained TGS session key to decrypt the second message from the user device 110. The TGS 134 validates that the username matches in the TGT and the second message from the user device 110, that the respective timestamps are close, and that the IP address from which the three messages were received matches the user IP address in the TGT.

The TGS 134 generates two messages to send to the user device 110: First, a message encrypted with the TGS session key, the message including the service name, a timestamp, the TGT lifetime, and a service session key. Second, a service ticket encrypted with a service secret key, the service ticket including the username, service name, a timestamp, the user IP address, a lifetime for the service ticket, and the service session key. The TGS 134 sends the messages to the user device 110.

The user device 110 decrypts the first message using the previously obtained TGS session key and uses the service session key from the decrypted first message to encrypt a new message to the target server, the message including the username and a timestamp. The user device 110 sends the new message and the service ticket to the target server. The target server decrypts the service ticket with its service secret key and decrypts the other message with the service session key obtained from the decrypted service ticket. The target server validates the usernames, timestamps, IP addresses, and lifetimes, and generates a service authenticator, encrypted with the service session key, to send to the user device 110 after validating. The service authenticator includes the service identifier and a timestamp. The target server sends the service authenticator to the user device 110. The user device 110 decrypts the service authenticator using the service session key, obtained from the TGS 134, and validates the service name matches the requested service name. Upon completion, the user device 110 and target server are mutually authenticated for the duration of the service ticket lifetime.

The network 140 comprises any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 120 may be encrypted using any suitable technique or techniques.

The network 140 includes DNS servers for resolving DNS queries to translate hostnames (domain names) into IP addresses. A first DNS server is a DNS Resolver that receives DNS queries from computing devices, such as the user device 110, and performs one or more additional requests to other DNS servers to identify an IP address with which to answer the DNS query.

A second DNS server is a DNS Root Nameserver that contains records of top-level domains (TLDs) such as .com, .net, .org, .uk, .jp, and so on. The DNS Resolver propagates the DNS query to a DNS Root Nameserver based on the TLD of the hostname included in the DNS query. For example, if the DNS query was for foo.example.com, the DNS Resolver propagates the DNS query to a DNS Root Nameserver for the .com TLD.

A third DNS server is a DNS Authoritative Nameserver, which stores records regarding specific domains, such as example.com. The DNS Root Nameserver propagates the DNS query to the DNS Authoritative Nameserver to process the DNS query and return an IP address. If the DNS query were for example.com, the DNS Authoritative Nameserver would translate the hostname "example.com" into an IP address and return the IP address, which is duly propagated back to the DNS Resolver, which then returns the IP address to the computing device from which the DNS query was received. If the DNS query were for a subdomain, such as foo.example.com, or a companion domain, the DNS Authoritative Nameserver may propagate the DNS query to a DNS Subdomain Authoritative Server, which stores records for subdomains, e.g., foo.example.com, and/or companion domains, of a domain, e.g., example.com. The DNS Subdomain Authoritative Server processes the DNS query and return an appropriate IP address. As used herein, returning the IP address may be understood as returning a DNS A record, which translates a domain name into an IP address.

Alternatively, in an embodiment, the DNS query is an iterative DNS query, where the computing device directly interfaces with the DNS servers to acquire the requested IP address, rather than going through a DNS Resolver intermediary as for a recursive DNS query as described above.

Depending upon the embodiment, the DNS Authoritative Server or DNS Subdomain Authoritative Server may return a CNAME record or other DNS record rather than an A record that contains an IP address. In such embodiments, the DNS Resolver (or, in the case of an iterative DNS query, the querying computing device) performs an additional round of querying to process the retrieved DNS record and return an A record containing the IP address. Depending upon the embodiment, the DNS Resolver or querying computing device may perform two or more rounds of DNS querying, e.g., if a first returned record is a CNAME record to a first domain, and that returned record, upon propagation through the DNS servers, returns a CNAME record to a second domain, and that returned record, upon processing through the DNS servers, returns a CNAME record to a third domain, and so on.

DNS zone files contain records mapping web resource data to other web resource data. As a non-exhaustive set of examples, A records and AAAA records map domain names to IP addresses, the former for IPv4 addresses, the latter for IPv6 addresses; CNAME records map domain names to other domain names (e.g., example.com to foobar.com); MX records direct email to a domain name, e.g., to the domain name of a mail server; NS records indicate which DNS server is authoritative for a particular domain; and SOA records store domain-specific administrative information, such as the email address of the administrator of a domain. An ALIAS record is an additional record type enabled by an extension provided by DNS vendors. ALIAS records specify domain names that point to other domain names but which resolve to A records at the time of request (rather than returning another domain name, as would a CNAME). CNAME, A, AAAA, and other records can conflict with ALIAS records for a particular domain. As such, as described below, it is advantageous to use a dual domain technique to employ the utility of an ALIAS record for authenticating a user via the Kerberos protocol.

FIG. 2A illustrates DNS records related to a target site hosted by a cloud computing infrastructure, according to one embodiment. The DNS records illustrated are those returned responsive to a DNS query for an IP address of the target site 126. The cloud computing infrastructure includes a complex domain topography, e.g., due to its size in terms of servers, which may be organized in a hierarchy to manage data flow. As such, the DNS records for the cloud computing infrastructure may be complex, as illustrated in the figure, where obtaining the IP address of a server hosting the target site 126 involves diving through several layers of CNAME records. This would involve multiple rounds of DNS queries, as described above. For example, a DNS query to obtain the IP address for foo.target-site.com first returns the CNAME record 210A, which points to domain internal.node.target-site.com. internal.node.target-site.com may be a backend domain of the target site 126 to interface with a cloud computing provider, for example.

The DNS query would then recursively resolve the domain internal.node.target-site.com to obtain the desired IP address. This round of DNS query resolution would return the CNAME record 210B, which points internal.node.target-site.com to a server of the cloud computing provider 120, e.g., asd543qw87z1.us-east-1.cloudprovider.com, which may be a network load balancer like internal node 122. This would lead to a third round of DNS query resolution, returning an A record 210C and an AAAA record 210D for the domain asd543qw87z1.us-east-1.cloudprovider.com. A record 210C is for (example) IPv4 address 248.176.123.247, and AAAA record 210D is for (example) IPv6 address 5ab3:d19c:c824:1cb2:fa80:f8f1:90fa:dc68, each of which is the IP address of a web server of the cloud computing provider 120 that hosts the target site 126. There may be two such servers, for example, to handle a particular amount of network traffic that exceeds the capabilities of one server, or to provide redundancy in case one server goes down. To respond to the DNS query, either suffices for directing the user to the target site 126.

The DNS query process described above corresponds to a first domain of the target site 126, e.g., foo.example.com. The DNS records for foo.example.com include the CNAME, A, and AAAA records returned in the course of resolving the DNS query. Because the resolution process initially returns a CNAME, the Kerberos authentication process may fail for a user attempting to authenticate for the target site 126, and the KDC 130 may refuse to issue a service ticket. This is because the server name used by Kerberos may be one of the intermediary servers named in the CNAME records, rather than the IP addresses of the web servers, which are the server names for which the user wishes to authenticate. As such, the KDC 130 resolves the target server name or identifier received in the request to another server name, e.g., an intermediary server like internal node 122. The KDC 130 typically would not be able to find a matching Service Principal Name for that intermediary server, and therefore would refuse to issue a service ticket.

FIG. 2B illustrates DNS records related to a target site hosted by a cloud computing infrastructure, according to a second embodiment. The DNS records illustrated are those returned responsive to a DNS query for an IP address of a companion domain of the target site 126, e.g., foo.kerberos.target-site.com. The DNS query resolves domain name foo.kerberos.target-site.com directly to the A record 220A and AAAA record 220B, without passing through several layers of CNAME records. This is because the zone file for the companion domain includes an ALIAS record forfoo.kerberos.target-site.com, which resolves directly to the underlying IP addresses of the web servers. As such, a Kerberos authentication request to the companion domain, e.g., foo.kerberos.example.com, returns a service ticket for a correct server, a web server hosting the target site 126. The user will therefore be able to access the target site 126, because the service ticket does authenticate the user for the proper server.

Figure 3:
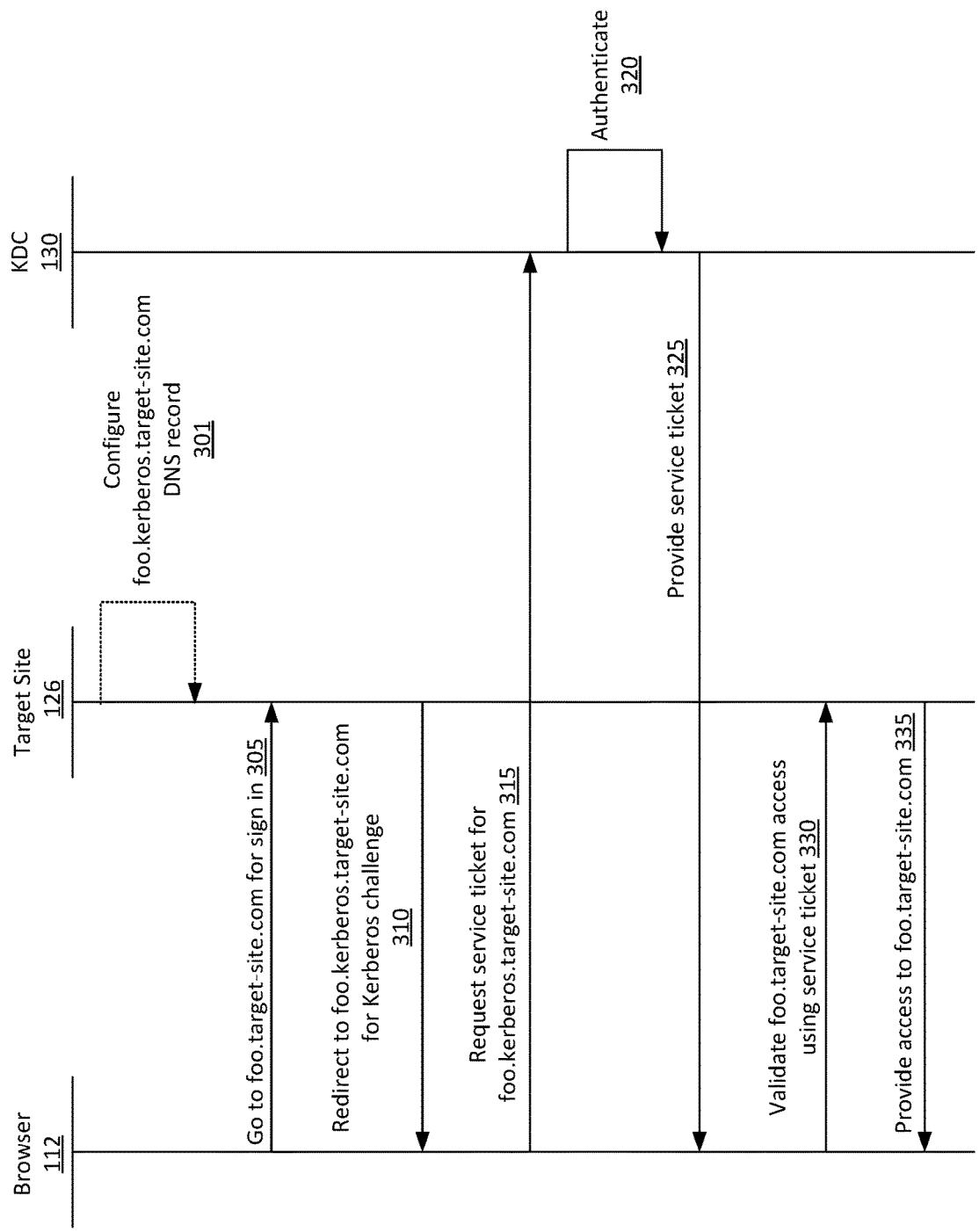
FIG. 3 is a sequence diagram illustrating interactions among a browser, a target site, and a Kerberos Key Distribution Center, according to one embodiment.

FIG. 3 is a sequence diagram illustrating interactions among a browser, a target site, and a Kerberos Key Distribution Center, according to one embodiment. The target site includes a domain, e.g., target-site.com, a subdomain, e.g., foo.target-site.com, and a companion domain, e.g., foo.kerberos.target-site.com. The zone file for the subdomain does not include an ALIAS record. For example, the zone file for the subdomain may be similar to the DNS records of FIG. 2A. However, the target site 126 configures 301 the zone file for the companion domain, e.g., foo.kerberos.target-site.com, such that it includes an ALIAS record pointing foo.kerberos.target-site.com to a bottom-level IP address of a host web server. After configuration 301, the zone file for the companion domain remains configured with an ALIAS record.

The browser 112 of the user device 110 requests access 305 to the subdomain, e.g., foo.target-site.com. This may be, for example, a user-specific portion of the target site 126 that is secured such that only the user can access it. Upon receiving the request from the browser 112 to provide access to the subdomain, the target site 126 responds 310 with a web page that includes a redirect script.

The redirect script is a script, e.g., a JAVASCRIPT module, that redirects the browser 112 from the subdomain to the companion domain, e.g., from foo.target-site.com to foo.kerberos.target-site.com.

Upon the browser redirecting to the companion domain, the companion domain sends an authentication challenge to the browser. The authentication challenge is a message to the browser 112 indicating that the browser should authenticate itself with the target site 126 to obtain access. The authentication challenge can be a Hypertext Transfer Protocol (HTTP) request including response code 401, which is an error status response code that indicates a request has not been fulfilled because it lacks valid authentication credentials. The authentication challenge also includes a message on how the browser 112 should authenticate. For example, the message may be a WWW-Authenticate header comprising a Negotiate type value for Simple and Protected Generic Security Services Application Program Interface Negotiation Mechanism (SPNEGO) authentication. The target site 126 may also initialize the SPNEGO mechanism upon sending the authentication challenge in order to enable the browser 112 to interface with the KDC 130.

In response to the authentication challenge, the browser 112 requests 315 a service ticket for the user to access the companion domain, e.g., foo.kerberos.target-site.com. The KDC 130 authenticates 320 the user for the target server based on the DNS records of the companion domain because the browser 112 was redirected to the companion domain. As such, the target server is identified as the web server hosting the target site 126, rather than for an intermediary server, because the zone file for the companion domain includes the ALIAS record for the companion domain's domain name. The KDC 130 provides 325 the service ticket to the browser 112. Upon receiving the service ticket, the web page may redirect the browser 112 back to the subdomain and send the service ticket with it, e.g., using the SPNEGO mechanism.

The browser 112 validates 330 the user for the subdomain using the service ticket received in response to authenticating in the companion domain. Because the user is validated for the correct web server, the target site 126 provides 335 access to the subdomain to the user in response to the service ticket. As such, the user is able to access the subdomain as requested.

As explained above, without this technique, the authentication flow would be based on the zone file of the subdomain, which lacks an ALIAS record. As such, the user would likely not be granted a service ticket. The user would then be unable to access the target site 126, the subdomain, because the browser 112 does not have a service ticket. The techniques described herein provide for user authentication in a cloud computing environment using Kerberos such that the user can gain a service ticket for the subdomain.

Figure 4:
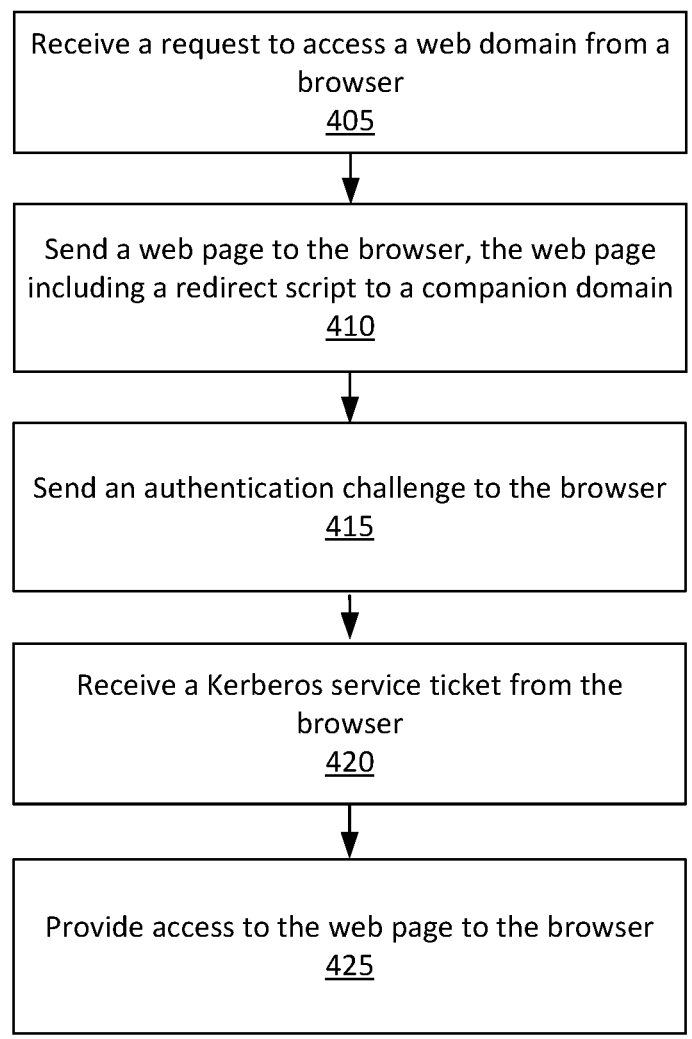
FIG. 4 illustrates a method for dual domain cloud Kerberos authentication, according to one embodiment.

FIG. 4 illustrates a method for dual domain cloud Kerberos authentication, according to one embodiment. A server receives 405 a request to access a web domain from a browser. The server sends 410 a web page to the browser, the web page including a redirect script, e.g., to a companion domain. The server sends 415 an authentication challenge to the browser. The server receives 420 a Kerberos service ticket from the browser. The server provides 425 access to the web page to the browser.

Computing Hardware

Figure 5:
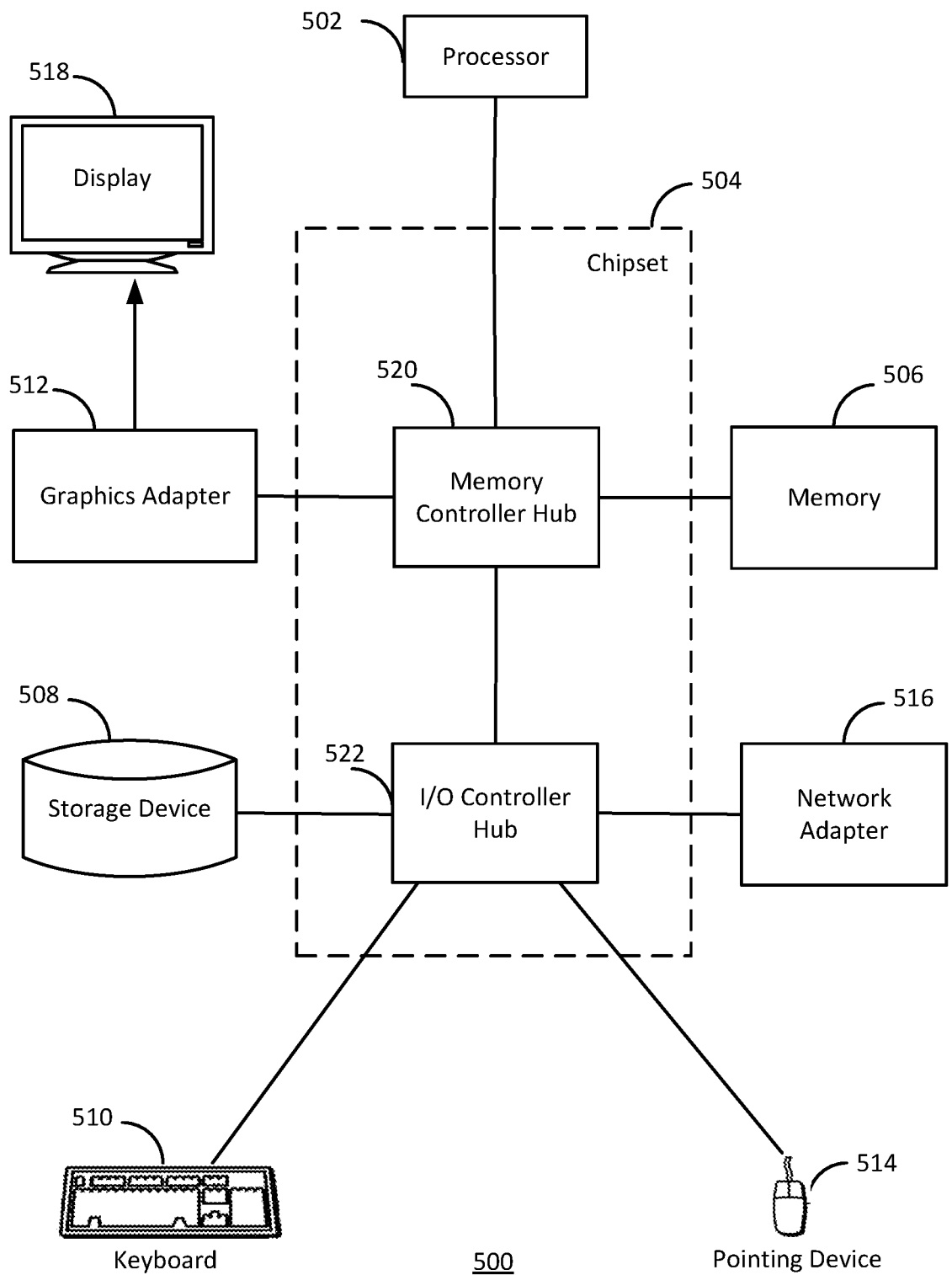
FIG. 5 is a high-level block diagram illustrating physical components of a computer, according to one embodiment.

FIG. 5 is a high-level block diagram illustrating physical components of a computer 500 used as part or all of the user device 110, internal node 122, internal node 124, or KDC 130, according to one embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 acting as a server may lack a graphics adapter 512, and/or display 518, as well as a keyboard or pointing device. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for authorizing access to a web domain, the method comprising:
receiving, from a browser of a computing device, a request to access a web domain hosted on a cloud computing infrastructure;
sending, to the browser of the computing device:
a web page comprising a redirect script that redirects the browser to a particular companion domain of the web domain, wherein the particular companion domain comprises a domain name system (DNS) zone file comprising an ALIAS record for the particular subdomain; and
an authentication challenge for access to the web domain;
receiving, from the browser of the computing device, a Kerberos service ticket,
wherein the particular companion domain redirects the browser to the web domain from the particular companion domain responsive to receipt of the Kerberos service ticket; and
providing, to the browser, access to the web domain.

2. The computer-implemented method of claim 1, wherein the Kerberos service ticket is sent to the web domain using a Hypertext Transfer Protocol (HTTP) POST request.

3. The computer-implemented method of claim 1, wherein the web domain and the particular companion domain are administered by the same entity.

4. The computer-implemented method of claim 1, wherein authentication challenge comprises a Hypertext Transfer Protocol (HTTP) response code 401 and a WWW-Authenticate response header comprising a Negotiate type value for Simple and Protected Generic Security Services Application Program Interface Negotiation Mechanism (SPNEGO) authentication.

5. The computer-implemented method of claim 1, wherein the ALIAS record for the particular companion domain points to an Internet Protocol (IP) address of a cloud computing provider computing device that hosts the web domain.

6. The computer-implemented method of claim 1, wherein the received Kerberos service ticket was obtained by the browser from a Kerberos Key Distribution Center (KDC) responsive to a request by the browser for the Kerberos service ticket.

7. The computer-implemented method of claim 6, wherein the request by the browser for the Kerberos service ticket comprised an Internet Protocol (IP) address resolved from the ALIAS record of the particular companion domain.

8. A non-transitory computer-readable storage medium storing computer program instructions executable by a computer processor to perform operations for authorizing access to a web domain, the operations comprising:
receiving, from a browser of a computing device, a request to access a web domain hosted on a cloud computing infrastructure;
sending, to the browser of the computing device:
a web page comprising a redirect script that redirects the browser to a particular companion domain of the web domain, wherein the particular companion domain comprises a domain name system (DNS) zone file comprising an ALIAS record for the particular subdomain; and
an authentication challenge for access to the web domain;
receiving, from the browser of the computing device, a Kerberos service ticket, wherein the particular companion domain redirects the browser to the web domain from the particular companion domain responsive to receipt of the Kerberos service ticket; and
providing, to the browser, access to the web domain.

9. The non-transitory computer-readable storage medium of claim 8, wherein the Kerberos service ticket is sent to the web domain using a Hypertext Transfer Protocol (HTTP) POST request.

10. The non-transitory computer-readable storage medium of claim 8, wherein the web domain and the particular companion domain are administered by the same entity.

11. The non-transitory computer-readable storage medium of claim 8, wherein authentication challenge comprises a Hypertext Transfer Protocol (HTTP) response code 401 and a WWW-Authenticate response header comprising a Negotiate type value for Simple and Protected Generic Security Services Application Program Interface Negotiation Mechanism (SPNEGO) authentication.

12. The non-transitory computer-readable storage medium of claim 8, wherein the ALIAS record for the particular companion domain points to an Internet Protocol (IP) address of a cloud computing provider computing device that hosts the web domain.

13. The non-transitory computer-readable storage medium of claim 8, wherein the received Kerberos service ticket was obtained by the browser from a Kerberos Key Distribution Center (KDC) responsive to a request by the browser for the Kerberos service ticket.

14. The non-transitory computer-readable storage medium of claim 13, wherein the request by the browser for the Kerberos service ticket comprised an Internet Protocol (IP) address resolved from the ALIAS record of the particular companion domain.

15. A system, comprising:
a computer processor; and
a non-transitory computer-readable storage medium storing computer program instructions executable by the computer processor to perform operations for authorizing access to a web domain, the operations comprising:
receiving, from a browser of a computing device, a request to access a web domain hosted on a cloud computing infrastructure;
sending, to the browser of the computing device:
a web page comprising a redirect script that redirects the browser to a particular companion domain of the web domain, wherein the particular companion domain comprises a domain name system (DNS) zone file comprising an ALIAS record for the particular subdomain; and
an authentication challenge for access to the web domain;
receiving, from the browser of the computing device, a Kerberos service ticket, wherein the particular companion domain redirects the browser to the web domain from the particular companion domain responsive to receipt of the Kerberos service ticket; and providing, to the browser, access to the web domain.

16. The system of claim 15, wherein the web domain and the particular companion domain are administered by the same entity.

17. The system of claim 15, wherein authentication challenge comprises a Hypertext Transfer Protocol (HTTP) response code 401 and a WWW-Authenticate response header comprising a Negotiate type value for Simple and Protected Generic Security Services Application Program Interface Negotiation Mechanism (SPNEGO) authentication.

* * * * *